United States Patent
Saito

(10) Patent No.: US 11,184,405 B2
(45) Date of Patent: *Nov. 23, 2021

(54) SYSTEM FOR CHANGING SECURITY SETTINGS BASED ON NETWORK CONNECTIONS

(71) Applicant: FUJIFILM BUSINESS INNOVATION CORP., Tokyo (JP)

(72) Inventor: Kazutaka Saito, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 100 days.

This patent is subject to a terminal disclaimer.

(21) Appl. No.: 16/385,346

(22) Filed: Apr. 16, 2019

(65) Prior Publication Data

US 2019/0246007 A1 Aug. 8, 2019

Related U.S. Application Data

(63) Continuation of application No. 14/693,587, filed on Apr. 22, 2015, now Pat. No. 10,321,018.

(30) Foreign Application Priority Data

Sep. 24, 2014 (JP) ................... 2014-194231

(51) Int. Cl.
*H04L 29/06* (2006.01)
*H04N 1/44* (2006.01)
(Continued)

(52) U.S. Cl.
CPC .......... *H04L 63/205* (2013.01); *H04L 63/107* (2013.01); *H04N 1/00962* (2013.01); *H04N 1/32502* (2013.01); *H04N 1/4433* (2013.01)

(58) Field of Classification Search
CPC ................ H04L 63/08; H04L 63/0876; H04L 63/10–107; H04L 63/20–205; H04N 1/4433

See application file for complete search history.

(56) References Cited

U.S. PATENT DOCUMENTS

| 5,838,907 A | 11/1998 | Hansen |
| 7,277,547 B1 * | 10/2007 | Delker ................. H04W 12/03 380/270 |

(Continued)

FOREIGN PATENT DOCUMENTS

| CN | 102687458 A | 9/2012 |
| JP | 2001025062 A | 1/2001 |

(Continued)

OTHER PUBLICATIONS

Computer Desktop Encyclopedia—processor. Retrieved: Oct. 5, 2017, from http://lookup.computerlanguage.com/host_app/search?cid=C999999&term=processor (Year: 2017).*

(Continued)

*Primary Examiner* — Kevin Bechtel
(74) *Attorney, Agent, or Firm* — Oliff PLC

(57) ABSTRACT

An information processing apparatus includes a processor configured to detect a new assignment of a first communication interface, and determines whether a network in which the first communication interface and a second communication interface are connected is a shared network. The determination by the processor is based on whether the first communication interface and the second communication interface communicate with each other when the first communication interface and the second communication interface are connected to an intranet. The processing device changes a security setting of the second communication interface based on a result of the determination.

5 Claims, 8 Drawing Sheets

| | SECOND COMMUNICATION INTERFACE | SECOND COMMUNICATION INTERFACE AFTER DETECTION OF FIRST COMMUNICATION INTERFACE | FIRST COMMUNICATION INTERFACE |
|---|---|---|---|
| TYPE OF NETWORK | INTRANET | INTRANET | INTRANET |
| FORM OF OPERATION | — | INDEPENDENT NETWORK | INDEPENDENT NETWORK |
| MACHINE ADMINISTRATOR ID | 11111 | 11111 | 11111 |
| MACHINE ADMINISTRATOR PASSWORD | master | master | master |
| CONFIDENTIAL BOX ACCESS LIMITATION | NOT PROHIBITED | PROHIBITED | PROHIBITED |
| ICMP REPLY LIMITATION | REPLY ALLOWED | REPLY ALLOWED | REPLY ALLOWED |
| NETWORK ADMINISTRATOR ID | 22222 | 22222 | 22222 |
| NETWORK ADMINISTRATOR PASSWORD | LAN1 | LAN1 MAC ADDRESS | LAN2 MAC ADDRESS |
| IP ACCESS LIMITATION | OFF | OFF | OFF |
| WEB ACCESS AUTHENTICATION | OFF | ON | ON |

(51) Int. Cl.
*H04N 1/00* (2006.01)
*H04N 1/32* (2006.01)

(56) References Cited

U.S. PATENT DOCUMENTS

| | | | |
|---|---|---|---|
| 7,983,402 | B2 | 7/2011 | Ohara et al. |
| 8,718,078 | B2 | 5/2014 | Ooba |
| 8,755,069 | B2 | 6/2014 | Nakagawa |
| 8,848,608 | B1 | 9/2014 | Addepalli et al. |
| 9,413,783 | B1 | 8/2016 | Keogh |
| 2004/0075863 | A1 | 4/2004 | Suzuki et al. |
| 2005/0089025 | A1 | 4/2005 | Boyer et al. |
| 2006/0012805 | A1 | 1/2006 | Liu |
| 2006/0159029 | A1 | 7/2006 | Samuels et al. |
| 2006/0161400 | A1 | 7/2006 | Kagan |
| 2010/0010593 | A1 | 1/2010 | Wagennar Cacciola et al. |
| 2010/0235883 | A1* | 9/2010 | Sato ............ H04N 1/4433 726/3 |
| 2011/0063670 | A1 | 3/2011 | Ito |
| 2011/0080609 | A1 | 4/2011 | Park |
| 2012/0036240 | A1 | 2/2012 | Lancaster et al. |
| 2013/0107316 | A1 | 5/2013 | Kwon |
| 2013/0107794 | A1 | 5/2013 | Yamada |
| 2013/0110995 | A1 | 5/2013 | Kwon |
| 2014/0282877 | A1* | 9/2014 | Mahaffey ............ H04W 12/08 726/3 |
| 2015/0163100 | A1* | 6/2015 | Graf ................ H04L 45/02 370/255 |
| 2015/0261476 | A1 | 9/2015 | Yamada |
| 2017/0034866 | A1 | 2/2017 | Wager et al. |

FOREIGN PATENT DOCUMENTS

| | | |
|---|---|---|
| JP | 2007042015 A | 2/2007 |
| JP | 2011066714 A | 3/2011 |
| JP | 2011114806 A | 6/2011 |
| JP | 2011244259 A | 12/2011 |
| JP | 2011254127 A | 12/2011 |
| JP | 2013511206 A | 3/2013 |
| WO | 2011059768 A2 | 5/2011 |

OTHER PUBLICATIONS

Feb. 5, 2018 Office Action Issued in Chinese Patent Application No. 201510303215.5.

* cited by examiner

FIG. 3

| ITEMS | SETTINGS |
|---|---|
| MACHINE ADMINISTRATOR ID | 11111 |
| MACHINE ADMINISTRATOR PASSWORD | admin |
| CONFIDENTIAL BOX ACCESS LIMITATION | PASSWORD NEEDED |
| ICMP REPLY LIMITATION | REPLY ALLOWED |

FIG. 4

| ITEMS | FIRST COMMUNICATION INTERFACE SETTINGS | SECOND COMMUNICATION INTERFACE SETTINGS | THIRD COMMUNICATION INTERFACE SETTINGS |
|---|---|---|---|
| NETWORK ADMINISTRATOR ID | 44444 | 66666 | 88888 |
| NETWORK ADMINISTRATOR PASSWORD | 55555 | 77777 | 99999 |
| IP ACCESS LIMITATION | OFF | OFF | OFF |
| WEB ACCESS AUTHENTICATION | ON | ON | ON |
| LPD | ON | ON | ON |
| EMAIL TRANSMISSION PORT | ON | ON | ON |
| EMAIL RECEPTION PORT | ON | ON | ON |
| SIP | ON | ON | ON |
| INTERNET SERVICES | ON | OFF | OFF |
| COLOR PRINTING LIMITATION | OFF | | |
| SCAN TRANSFER SIZE LIMITATION | 1 MBYTE | 1 MBYTE | 1 MBYTE |
| FACSIMILE OUTPUT DESTINATION | MAILBOX | MAILBOX | MAILBOX |
| ... | | | |

FIG. 5

| | SECOND COMMUNICATION INTERFACE | SECOND COMMUNICATION INTERFACE AFTER DETECTION OF FIRST COMMUNICATION INTERFACE | FIRST COMMUNICATION INTERFACE |
|---|---|---|---|
| TYPE OF NETWORK | INTRANET | INTRANET | INTRANET |
| FORM OF OPERATION | — | INDEPENDENT NETWORK | INDEPENDENT NETWORK |
| MACHINE ADMINISTRATOR ID | 11111 | 11111 | 11111 |
| MACHINE ADMINISTRATOR PASSWORD | master | master | master |
| CONFIDENTIAL BOX ACCESS LIMITATION | NOT PROHIBITED | PROHIBITED | PROHIBITED |
| ICMP REPLY LIMITATION | REPLY ALLOWED | REPLY ALLOWED | REPLY ALLOWED |
| NETWORK ADMINISTRATOR ID | 22222 | 22222 | 22222 |
| NETWORK ADMINISTRATOR PASSWORD | LAN1 | LAN1 MAC ADDRESS | LAN2 MAC ADDRESS |
| IP ACCESS LIMITATION | OFF | OFF | OFF |
| WEB ACCESS AUTHENTICATION | OFF | ON | ON |

FIG. 6

| | SECOND COMMUNICATION INTERFACE | SECOND COMMUNICATION INTERFACE AFTER DETECTION OF FIRST COMMUNICATION INTERFACE | FIRST COMMUNICATION INTERFACE |
|---|---|---|---|
| TYPE OF NETWORK | INTRANET | INTRANET | INTRANET |
| FORM OF OPERATION | — | SHARED NETWORK | SHARED NETWORK |
| MACHINE ADMINISTRATOR ID | 11111 | 11111 | 11111 |
| MACHINE ADMINISTRATOR PASSWORD | admin | SERIAL NUMBER | SERIAL NUMBER |
| CONFIDENTIAL BOX ACCESS LIMITATION | NOT PROHIBITED | NOT PROHIBITED | NOT PROHIBITED |
| ICMP REPLY LIMITATION | REPLY ALLOWED | REPLY ALLOWED | REPLY ALLOWED |
| NETWORK ADMINISTRATOR ID | 22222 | 22222 | 22222 |
| NETWORK ADMINISTRATOR PASSWORD | LAN1 | LAN1 MAC ADDRESS | LAN2 MAC ADDRESS |
| IP ACCESS LIMITATION | OFF | OFF | OFF |
| WEB ACCESS AUTHENTICATION | OFF | OFF | OFF |

FIG. 7

| | SECOND COMMUNICATION INTERFACE | SECOND COMMUNICATION INTERFACE AFTER DETECTION OF FIRST COMMUNICATION INTERFACE | FIRST COMMUNICATION INTERFACE |
|---|---|---|---|
| TYPE OF NETWORK | INTRANET | INTRANET | INTRANET |
| FORM OF OPERATION | — | INDEPENDENT NETWORK | INDEPENDENT NETWORK |
| MACHINE ADMINISTRATOR ID | 11111 | 11111 | 11111 |
| MACHINE ADMINISTRATOR PASSWORD | admin | SERIAL NUMBER | SERIAL NUMBER |
| CONFIDENTIAL BOX ACCESS LIMITATION | NOT PROHIBITED | PROHIBITED | PROHIBITED |
| ICMP REPLY LIMITATION | REPLY ALLOWED | PROHIBITED | PROHIBITED |
| NETWORK ADMINISTRATOR ID | 22222 | 22222 | 22222 |
| NETWORK ADMINISTRATOR PASSWORD | LAN1 | LAN1 MAC ADDRESS | LAN2 MAC ADDRESS |
| IP ACCESS LIMITATION | OFF | OFF | ON ALL IP PROHIBITED |
| WEB ACCESS AUTHENTICATION | OFF | ON | ON |

SYSTEM FOR CHANGING SECURITY SETTINGS BASED ON NETWORK CONNECTIONS

CROSS-REFERENCE TO RELATED APPLICATIONS

This application is a Continuation of U.S. patent application Ser. No. 14/693,587 filed Apr. 22, 2015, which is based on and claims priority under 35 USC 119 from Japanese Patent Application No. 14-194231 filed Sep. 24, 2014, the descriptions of which are incorporated herein by reference.

BACKGROUND

(i) Technical Field

The present invention relates to an information processing apparatus, an information processing method, and a non-transitory computer readable medium.

(ii) Related Art

Currently, an information processing apparatus, such as a printer or a scanner, is provided with plural physical or virtual communication interfaces and is capable of connecting the communication interfaces to different communication networks respectively. In doing so, the information processing apparatus performs communication over the plural networks, such as a local area network (LAN), a wide area network (WAN), and the like.

In a case where a new communication interface has been assigned to the information processing apparatus or in a case where settings of an earlier-assigned communication interface have been changed in the information processing apparatus, it may be necessary to change settings of the newly assigned communication interface or of a communication interface (hereinafter referred to as an existing communication interface) which has been assigned earlier and for which settings have not been changed. For example, for an information processing apparatus in which an existing communication interface is used to connect to an internal network, such as an intranet, it is conceivable that security settings for intranets have been set.

SUMMARY

According to an aspect of the invention, there is provided an information processing apparatus including a detection unit and a change unit. The detection unit detects a first communication interface which has been newly assigned to the information processing apparatus, and a first network to which a connection is made via the first communication interface. The change unit changes, in a case where the first network and a second network to which a connection is made via a second communication interface that has been assigned earlier have an independent relationship, settings for a limitation on use of a service via the second communication interface.

BRIEF DESCRIPTION OF THE DRAWINGS

An exemplary embodiment of the present invention will be described in detail based on the following figures, wherein:

FIG. 3 is a diagram for describing an example of common settings;

FIG. 4 is a diagram for describing an example of specific settings;

FIG. 5 is a diagram for describing an example of a process of changing settings;

FIG. 6 is a diagram for describing another example of the process of changing settings;

FIG. 7 is a diagram for describing another example of the process of changing settings.

DETAILED DESCRIPTION

Hereinafter, an exemplary embodiment of the present invention will be described with reference to the drawings.

1. Hardware Configuration of Information Processing Apparatus

Figure 1:
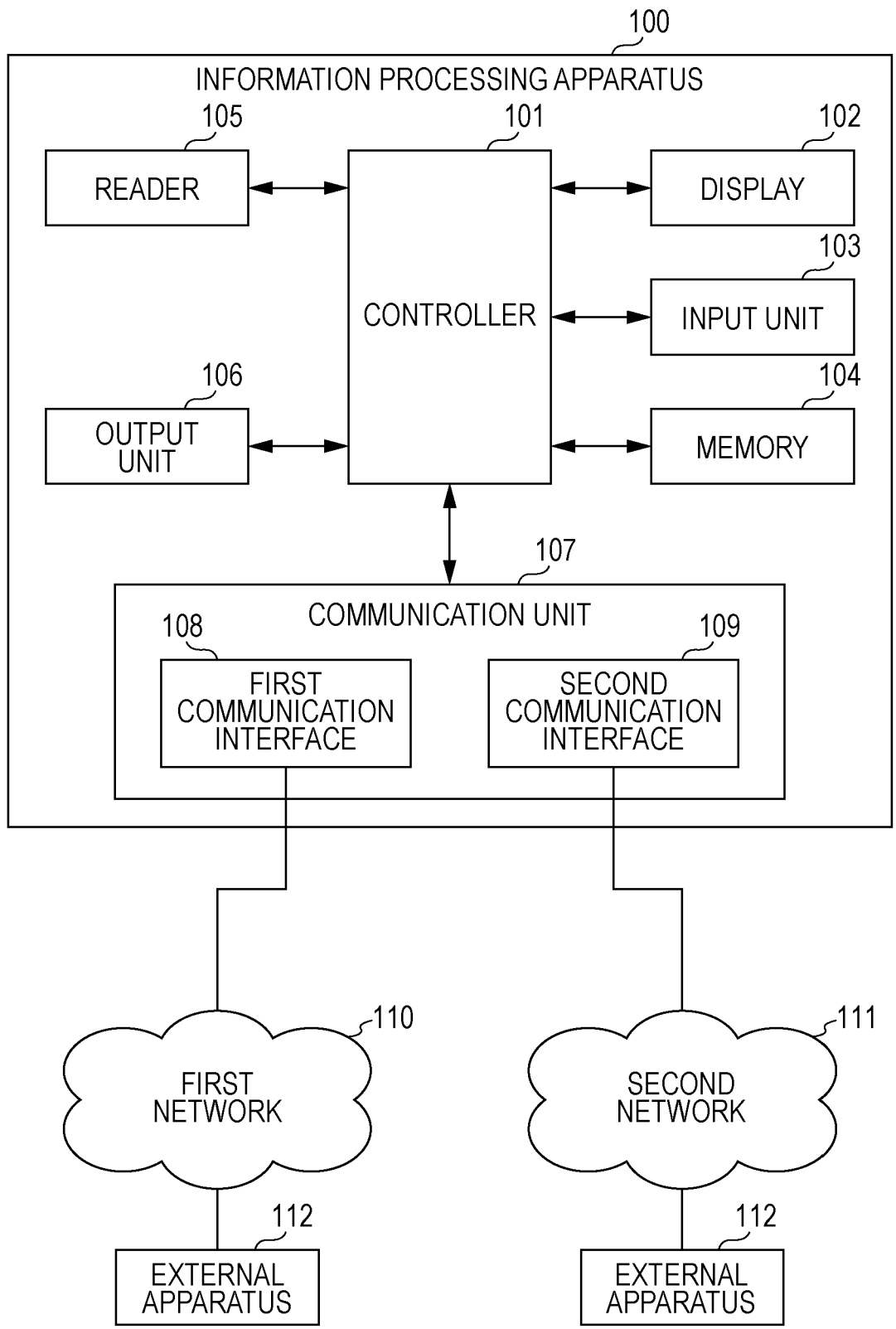
FIG. 1 is a diagram for describing a hardware configuration of an information processing apparatus and an example of apparatuses connected to the information processing apparatus.

FIG. 1 is a diagram illustrating a hardware configuration of an information processing apparatus 100 according to an exemplary embodiment of the present invention, and an example of apparatuses connected to the information processing apparatus 100. As illustrated in FIG. 1, the information processing apparatus 100 includes a controller 101, a display 102, an input unit 103, a memory 104, a reader 105, an output unit 106, and a communication unit 107. The information processing apparatus 100 may include an operation unit, a power switch, and so on in addition to the units illustrated in FIG. 1. The information processing apparatus 100 need not include the output unit 106, or may include the output unit 106 to form an image forming apparatus.

The controller 101 includes a central processing unit (CPU), performs various types of arithmetic processing, and controls each unit in the information processing apparatus 100 in accordance with a program stored on the memory 104. The controller 101 will be described in detail below.

The display 102 is constituted by a display device, such as a liquid crystal display, and displays the result of information processing performed by the controller 101 on a screen.

The input unit 103 is constituted by an input device, such as a touch panel, a button key, or the like, and accepts user input operations.

The memory 104 is constituted by information recording media, such as a read-only memory (ROM), a random access memory (RAM), and a hard disk, and serves as an information recording medium that retains the program executed by the controller 101. The memory 104 also operates as a work memory of the controller 101, for example. Note that various types of memories are usable as the memory 104. For example, the memory 104 may be implemented by using a memory device, such as a semiconductor memory, for example. The program and various types of data that are assumed to be stored on the memory 104 in this exemplary embodiment may be obtained from an external apparatus 112 via the communication unit 107 or may be obtained from an external storage medium.

The reader 105 is constituted by a scanner or the like. The reader 105 optically scans an object, such as a sheet, to thereby read an image of the object.

The output unit 106 is constituted by a printing unit or the like that forms an image on a sheet (recording medium), such as paper. The output unit 106 prints (outputs) image data or the like on a sheet, such as paper, in accordance with control performed by the controller 101.

The communication unit 107 is constituted by plural communication interfaces and performs wired or wireless data communication with the external apparatus 112 that is connected to the information processing apparatus 100. For example, as illustrated in FIG. 1, the communication unit 107 includes a first communication interface 108 and a second communication interface 109. Each communication interface is constituted by a network interface card (NIC) or the like.

Note that FIG. 1 illustrates the case where the communication unit 107 includes two communication interfaces; however, the number of communication interfaces included in the communication unit 107 may be any number as long as plural communication interfaces are included, and may be three or more. Each communication interface included in the communication unit 107 may be a physical interface or a logical interface.

A first network 110 and a second network 111 are each a LAN, the Internet, an intranet, a next-generation network (NGN), or the like. The first network 110 and the second network 111 may be networks that are not connected to each other and that are independent of each other, or may be shared networks that enable data communication between the first communication interface 108 and the second communication interface 109.

The external apparatus 112 is constituted by a server computer or the like. The server computer has a Dynamic Host Configuration Protocol (DHCP) function, for example, and assigns an Internet Protocol (IP) address in response to a request from the information processing apparatus 100. Note that the external apparatus 112 may be a portable terminal, for example. Plural external apparatuses 112 may be connected to each network.

2. Functions Implemented by Controller

Figure 2:
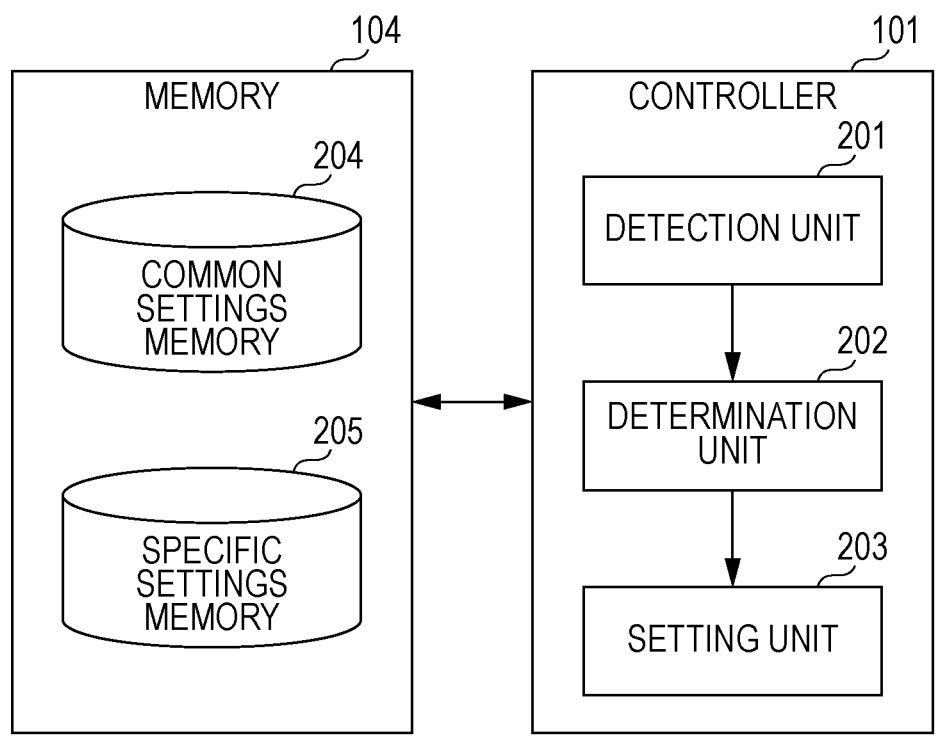
FIG. 2 is a diagram for describing a functional configuration of a controller.

FIG. 2 is a functional block diagram of the information processing apparatus 100. As illustrated in FIG. 2, the controller 101 includes functional units, that is, a detection unit 201, a determination unit 202, and a setting unit 203. The memory 104 includes functional units, that is, a common settings memory 204 and a specific settings memory 205. Each function illustrated in FIG. 2 is implemented by the controller 101 executing the program stored on the memory 104.

The detection unit 201 detects a communication interface newly assigned to the information processing apparatus 100 and network identification information used to identify a network to which a connection is made via the communication interface. Here, the network identification information is information that indicates the type of network, such as the Internet, an intranet, or the like, for example. A specific case is described where, in a state where the second communication interface 109 has been assigned to the information processing apparatus 100, the first communication interface 108 has been further assigned, for example. In this case, the detection unit 201 detects the newly assigned first communication interface 108 and network identification information indicating that the first network 110 to which a connection is made via the first communication interface 108 is the Internet.

A method for the detection unit 201 to determine whether a network to which a connection is made via each communication interface is the Internet, an intranet, or the like utilizes a technique in the related art (Japanese Unexamined Patent Application Publication No. 2011-244259, for example) in which determination is performed on the basis of information regarding the vendor type obtained from a DHCP server, for example, and therefore, detailed description of the method is omitted here. The detected network identification information is stored in association with information used to identify the assigned communication interface, on the memory 104 included in the information processing apparatus 100, or may be stored on a memory outside the information processing apparatus 100.

When the detection unit 201 has detected a communication interface, the determination unit 202 determines whether there are consequently plural communication interfaces assigned to the information processing apparatus 100. In a case where there are consequently plural communication interfaces assigned to the information processing apparatus 100, the determination unit 202 determines whether a network to which a connection is made via the communication interface and a network to which a connection is made via a communication interface that has been assigned earlier are shared networks or independent networks For example, in a case where the first network 110 is the Internet and the second network 111 an intranet, the determination unit 202 determines that the first network 110 and the second network 111 are independent of each other.

In a case where the first network 110 and the second network 111 are networks to each of which connection is made via an intranet, the determination unit 202 determines that the first network 110 and the second network 111 are independent networks if the first communication interface 108 and the second communication interface 109 are not reachable from each other, and determines that the first network 110 and the second network 111 are shared networks if the first communication interface 108 and the second communication interface 109 are reachable from each other. For example, the communication unit 107 attempts communication by using a ping command that is transmitted from the information processing apparatus 100 connected to the first network 110 to the external apparatus 112 connected to the second network 111, via the first network 110. If there is a response to the ping command, the determination unit 202 determines that the first communication interface 108 and the second communication interface 109 are reachable from each other.

A specific case is described where an information terminal installed by a holding company is connected to the first network 110, and an information terminal installed by an affiliated company is connected to the second network 111, for example. In a case where both of the first network 110 and the second network 111 are intranets and the first communication interface 108 and the second communication interface 109 are reachable from each other, the determination unit 202 determines that the first network 110 and the second network 111 are shared networks. In a case where the network 110 is the Internet and the second network 111 is an intranet, the determination unit 202 determines that the first network 110 and the second network 111 are independent of each other.

In a case where the first network 110 and the second network 111 to which a connection is made via the second communication interface 109 that has been assigned earlier have an independent relationship, the setting unit 203 changes settings for a limitation on the use of a service via the second communication interface 109. In a case where the first network 110 and the second network 111 have a shared relationship, the setting unit. 203 sets settings that have been set for the second communication interface 109 for the first communication interface 108. Specifically, the setting unit 203 sets settings common to communication interfaces, as illustrated in FIG. 3, and sets settings specific to each communication interface, as illustrated in FIG. 4.

Next, settings of communication interfaces are described with reference to FIGS. 3 and 4. Settings that are set for each communication interface includes settings common to communication interfaces (hereinafter referred to as common settings), and settings specifically set for the communication interface (hereinafter referred to as specific settings). The common settings are stored on the common settings memory 204, and the specific settings are stored on the specific settings memory 205. Note that the common settings and the specific settings may be stored on a memory outside the information processing apparatus 100.

FIG. 3 illustrates common settings that have been set for communication interfaces assigned to the information processing apparatus 100. Settings relating to the machine administrator identification (ID) and the machine administrator password respectively indicated in the second and third rows in FIG. 3 represent authentication information that has been set in advance and that is used to authenticate the machine administrator of the information processing apparatus 100. Specifically, when the machine administrator inputs the authentication information that has been set in advance, namely, the machine administrator ID "11111" and, the machine administrator password "admin" illustrated in FIG. 3, for example, the machine administrator is allowed to enter an administration mode in which the machine administrator is able to set or change the function of the information processing apparatus 100.

A setting relating to a confidential box access limitation indicated in the fourth row in FIG. 3 represents whether password input is needed in order to access a confidential box, which is a directory that is included in the memory 104 and that has been set in advance. Specifically, in a case where "password needed" is set, for example, when a user has input a predetermined confidential box access password in order to access the confidential box, access to the confidential box is allowed. The setting relating to the confidential box access limitation may be a setting that simply indicates whether access to the confidential box is prohibited or not. The confidential box need not be included in the memory 104 of the information processing apparatus 100, and may be included in a memory outside the information processing apparatus 100. Furthermore, the number of confidential boxes is not limited to one. For example, no confidential box may be provided, or plural confidential boxes may be provided and different confidential box access passwords may be set for the respective confidential boxes.

A setting relating to an Internet Control Message Protocol (ICMP) reply limitation indicated in the fifth row in FIG. 3 indicates whether the information processing apparatus 100 makes a reply to a message in a case of checking reachability using ICMP. Specifically, in a case where "reply allowed" is set as the setting relating to the ICMP reply limitation, as illustrated in FIG. 3, for example, when the information processing apparatus 100 has received a message for checking reachability from the external apparatus 112, the information processing apparatus 100 transmits to the external apparatus 112 a reply message to the message.

As described above, the common settings represent settings common to communication interfaces. Note that the case has been described where the common settings include the settings relating to the machine administrator ID, machine administrator password, confidential box access limitation, and ICMP reply limitation, as illustrated in FIG. 3; however, the common settings may include some of the above settings, or may include settings other that the above settings.

Next, settings specific to each communication interface are described with reference to a table in FIG. 4 which indicates "first communication interface settings". Settings relating to the network administrator ID and the network administrator password respectively indicated in the second and third rows of the table in FIG. 4 represent authentication information that has been set in advance and that is used to access information regarding the first communication interface 108. Specifically, when the network administrator has input the authentication information that has been set in advance, namely, the network administrator ID "44444" and the network administrator password "55555" illustrated in FIG. 4, for example, the network administrator is allowed to access the information regarding the first communication interface 108.

A setting relating to an IP access limitation indicated in the fourth row of the table in FIG. 4 indicates whether access to the first communication interface 108 from an external apparatus other than the external apparatus 112 for which a specific IP address has been set is limited. Specifically, in a case where the setting relating to the IP access limitation is set to "OFF", as illustrated in FIG. 4, access to the first communication interface 108 from the external apparatus 112 is not limited. In a case where a specific IP address is set as the setting relating to the IP access limitation, the first communication interface 108 identifies the IP address of the external apparatus 112 that has requested access to the first communication interface 108, and allows the access if the identified IP address matches the IP address set as the setting relating to the IP access limitation. Note that plural IP addresses may be set as the setting relating to the IP access limitation.

A setting relating to Web access authentication indicated in the fifth row of the table in FIG. 4 indicates whether user authentication is performed in a case of changing the configuration of the information processing apparatus 100 from the external apparatus 112. Specifically, in a case where the setting relating to Web access authentication is set to "ON", as illustrated in FIG. 4, for example, an authentication screen for inputting a password or the like is displayed on the external apparatus 112 when a user is to change the configuration of the information processing apparatus 100 from the external apparatus 112. If authentication is successful, the user is allowed to access data inside the information processing apparatus 100 via the first communication interface 108.

A setting relating to Line Printer Daemon (LPD) indicated in the sixth row of the table in FIG. 4 indicates whether printing for which an instruction is given via the first communication interface 108 and which is performed by the information processing apparatus 100 in accordance with the LPD protocol is enabled. Specifically, in a case where the setting relating to LPD is set to "ON", as illustrated in FIG. 4, for example, when a user has instructed the information processing apparatus 100 to perform printing, from the external apparatus 112 via the corresponding communication interface, the information processing apparatus 100 performs printing in accordance with the instruction.

Settings relating to an email transmission port and an email reception port respectively indicated in the seventh and eighth rows of the table in FIG. 4 indicate whether transmission and reception of emails and/or Internet facsimiles via the first communication interface 108 are enabled. Specifically, in a case where both of the setting relating to the email transmission port and the setting relating to the email reception port are set to "ON", as illustrated in FIG. 4, for example, emails and Internet facsimiles are transmitted and received between the external apparatus 112 and the information processing apparatus 100 via the corresponding communication interface.

A setting relating to Session Initiation Protocol (SIP) indicated in the ninth row of the table in FIG. 4 indicates whether transmission and reception of IP facsimiles via each communication interface are enabled. Specifically, in a case where the setting relating to SIP is set to "ON", as illustrated in FIG. 4, for example, IP facsimiles are transmitted and received between the external apparatus 112 and the information processing apparatus 100 via the corresponding communication interface.

A setting relating to Internet services indicated in the tenth row of the table in FIG. 4 indicates whether performing of Web services is enabled between the information processing apparatus 100 and the external apparatus 112 via each communication interface. Specifically, in a case where the setting relating to Internet services is set to "ON", as illustrated in FIG. 4, for example, Web services are performed between the external apparatus 112 and the information processing apparatus 100 via the corresponding first communication interface 108.

A setting relating to a color printing limitation indicated in the eleventh row of the table in FIG. 4 indicates whether color printing to be performed by the information processing apparatus 100 via each communication interface is enabled. Specifically, in a case where the setting relating to the color printing limitation is set to "OFF", as illustrated in FIG. 4, for example, when print data that includes color information has been transmitted to the information processing apparatus 100 from the external apparatus 112 via the corresponding communication interface, the information processing apparatus 100 performs color printing on the basis of the print data. Note that, in a case where the setting relating to the color printing limitation is set to "ON", the information processing apparatus 100 performs printing after converting the print data into monochrome data.

A setting relating to a scan transfer size limitation indicated in the twelfth row of the table in FIG. 4 indicates the upper limit of the data size of data to be transferred between the external apparatus 112 and the information processing apparatus 100 via each communication interface. Specifically, in a case where the setting relating to the scan transfer size limitation is set to "1 Mbyte", as illustrated in FIG. 4, for example, data is transferred between the external apparatus 112 and the information processing apparatus 100 via the corresponding communication interface if the data size is equal to or less than 1 Mbyte; however, data is not transferred if the data size is larger than 1 Mbyte. Note that, in a case where data is not transferred, the display 102 may display information indicating that the data is not transferred.

A setting relating to a facsimile output destination indicated in the thirteenth row of the table in FIG. 4 indicates an output destination of IP facsimile documents or Internet facsimile documents output from the information processing apparatus 100 via each communication interface. Specifically, in a case where the setting relating to the facsimile output destination is set to "mailbox (ten-bin output device)", as illustrated in FIG. 4, for example, the information processing apparatus 100 outputs facsimile documents to the mailbox (ten-bin output device). In the tables that indicate "second communication interface settings" and "third communication interface settings" in FIG. 4, settings similar to "first communication interface settings" described above are set for the respective communication interfaces.

As described above, the specific settings represent settings that are set for each communication interface. Note that the case has been described where the specific settings include the settings illustrated in FIG. 4; however, the specific settings may include some of the above settings, or may include settings other than the above settings.

Referring back to FIG. 2, a description of the setting unit 203 is given. The setting unit 203 changes the common settings described above, or sets the specific settings described above for each communication interface, on the basis of the result of determination by the determination unit 202.

For example, in a case where the determination unit 202 determines that the first network 110 and the second network 111 are independent networks, the setting unit 203 newly sets common settings and specific settings for the first communication interface 108, and changes common settings and specific settings that have been set for the second communication interface 109.

In a case where the determination unit 202 determines that the networks are shared networks, the setting unit 203 may set settings for the newly assigned communication interface, the settings being specific settings that may be set for each communication interface and that are the same as those set for the earlier-assigned communication interface. A specific case is described where, in a state where the specific settings illustrated in FIG. 4 have been set for the second communication interface 109, the first communication interface 108 has been newly configured for the information processing apparatus 100, for example. It is assumed that the specific settings illustrated in FIG. 4 have not been set for the first communication interface 108 at the time of detection of the first communication interface 108. In this case, the setting unit 203 sets, for the first communication interface 108, the same specific settings as those of the second communication interface 109 illustrated in FIG. 4.

Note that the setting unit 203 may set specific settings for the newly assigned first communication interface 108 so that some of the specific settings are the same as those of the second communication interface 109 illustrated in FIG. 4. Specifically, the setting unit 203 may set, for the first communication interface 108, specific settings so that settings other than the setting relating to the network administrator ID and the setting relating to the network administrator password are the same as those of the second communication interface 109 illustrated in FIG. 4 and so that the setting relating to the network administrator ID and the setting relating to the network administrator password are different from those of the second communication interface 109.

In a case where the determination unit 202 determines that the networks are independent networks, the setting unit 203 checks the settings common to communication interfaces and changes the settings. The setting unit 203 may change the specific settings that have been set for the earlier-assigned communication interface. Specifically, in a case where the determination unit 202 determines that the first network 110 and the second network 111 are independent networks in the above-described example, the setting unit 203 may change the setting relating to the confidential box access limitation among the common settings to "password needed", and may change the setting relating to Web access authentication among the specific settings to "ON". In a case where the network identification information of the first network 110 indicates the Internet, the setting unit 203 may change the setting relating to the ICMP reply limitation to "reply prohibited" in addition to the above settings and may change the setting relating to the IP access limitation among the specific settings to "ON" in order to enhance security. In this case, the display 102 may display information indicating that the common and/or specific settings set for the earlier-assigned communication interface have been changed to thereby notify the user of the change.

As described above, in a case where a new communication interface has been assigned to the information processing apparatus 100, settings of each communication interface are changed or newly set in accordance with whether a network to which a connection is made via the earlier-assigned communication interface and a network to which a connection is made via the newly assigned communication interface are independent networks or are shared networks.

A specific and detailed example of operations performed by the determination unit 202 is described with reference to FIGS. 5 to 7. FIGS. 5 to 7 are diagrams for describing changes in settings set for each communication interface in a case where the first communication interface 108 has been newly detected while the second communication interface 109 has been assigned. The second column ("second communication interface") of the tables in FIGS. 5 to 7 indicates specific settings and common settings set for the second communication interface 109 before the first communication interface 106 is detected. The third column ("second communication interface after detection of first communication interface") of the tables in FIGS. 5 to 7 indicates specific settings and common settings set for the second communication interface 109 after the first communication interface 108 has been detected and the settings have been changed. The fourth column ("first communication interface") of the tables in FIGS. 5 to 7 indicates specific settings and common settings set for the newly-detected first communication interface 108.

The second and third rows of the tables in FIGS. 5 to 7 respectively indicate information that represents the type of network, such as the Internet or an intranet, connecting to each communication interface, and information that represents the form of operation, that is, whether the network connecting to each communication interface is an independent network or a shared network. The information in the fourth to seventh rows of the table in FIG. 5, that is, "machine administrator ID", "machine administrator password", "confidential box access limitation", and "ICMP reply limitation", represents common settings described with reference to FIG. 3, and the information in the eighth to eleventh rows, that is, "network administrator ID", "network administrator password", "IP access limitation", and "Web access authentication", represents specific settings described with reference to FIG. 4. Note that the information indicated in the second and third rows of the table in FIG. 5 is information for determining operations to be performed by the setting unit 203, and may be or need not be retained by the information processing apparatus 100. FIGS. 5 to 7 illustrate some of the common settings illustrated in FIG. 4; however, the other settings may be included in the tables in FIGS. 5 to 7.

FIG. 5 is a diagram for describing changes in settings set for each communication interface in a case where the first network 110 and the second network 111 are intranets and have an independent relationship. First, as illustrated in the second column of the table in FIG. 5, before the first communication interface 108 is detected, the second network 111 to which a connection is made via the second communication interface 109 is an intranet and is operated as a network that only specific users are allowed to access.

For the second communication interface 109, the default machine administrator ID "11111", a machine administrator password "master", a confidential box access limitation "not prohibited", and an ICMP reply limitation "reply allowed" are set as common settings. For the second communication interface 109, a network administrator ID "22222", a network administrator password "LAN1", an IP access limitation "OFF", and Web access authentication "OFF" are set as specific settings.

In the above-described state, the detection unit 201 detects the first communication interface 108 having been newly assigned to the information processing apparatus 100. It is assumed that the first network 110 to which a connection is made via the first communication interface 108 is operated as an intranet, and that the first communication interface 108 and the second communication interface 109 are not reachable from each other. In this case, the determination unit 202 determines that the first network 110 and the second network 111 are independent of each other. Accordingly, the setting unit 203 changes the settings of the second communication interface 109 so as to increase the security level, and sets new settings for the first communication interface 108.

Specifically, the setting unit 203 changes the setting relating to the confidential box access limitation for the second communication interface 109 to "prohibited". The setting unit 203 changes the setting relating to the network administrator password for the second communication interface 109 to the Media Access Control (MAC) address of LAN1.Furthermore, the setting unit 203 changes the setting relating to Web access authentication for the second communication interface 109 to "ON".

The setting unit 203 sets the same settings as the changed settings set for the second communication interface 109, as common settings of the first communication interface 108. The setting unit 203 newly sets the network administrator ID "22222", a network administrator password that is the MAC address of LAN2, the IP access limitation. "OFF", and Web access authentication "ON", as specific settings of the first communication interface 108. As described above, in a case where a network to which a connection is made via an existing communication interface and a network to which a connection is made via a newly detected communication interface have an independent. relationship, the setting unit 203 changes settings of the existing communication interface so as to increase the security level.

Next, a description is given of changes in settings set for each communication interface in a case where the first network 110 and the second network 111 have a shared relationship, with reference to FIG. 6. The items indicated in the table in FIG. 6 are similar to those in FIG. 5, and therefore, description thereof is omitted. First, as illustrated in the second column of the table in FIG. 6, the second network 111 to which a connection is made via the second communication interface 109 is an intranet before the first communication interface 108 is detected.

For the second communication interface 109, the machine administrator ID "11111", the machine administrator password "admin", the confidential box access limitation "not prohibited", and the ICMP reply limitation "reply allowed" are set as common settings. For the second communication interface 109, the network administrator ID "22222", the network administrator password "LAN1", the IP access limitation "OFF", and Web access authentication "OFF" are set as specific settings.

In the above-described state, the detection unit 201 detects the first communication interface 108 having been newly assigned to the information processing apparatus 100. It is assumed that the first network 110 to which a connection is made via the first communication interface 108 is an intranet, and that the first communication interface 108 and the second communication interface 109 are reachable from each other. In this case, the determination unit 202 determines that the first network 110 and the second network 111 are shared networks. Accordingly, the setting unit 203 only changes the settings relating to the passwords for the second communication interface 109. For the first communication interface 108, the setting unit 203 sets settings different from those of the second communication interface 109 for the settings relating to the passwords, and sets the same settings as those of the second communication interface 109 for the settings other than the passwords.

Specifically, the setting unit 203 changes the setting relating to the machine administrator password for the second communication interface 109 to a serial number, and changes the setting relating to the network administrator password to the MAC address of LAN1, The setting unit 203 sets the setting relating to the network administrator password for the first communication interface 108 to the MAC address of LAN2, and, for the other settings, sets the same settings as those of the second communication interface 109. As described above, in a case where a network to which a connection is made via an existing communication interface and a network to which a connection is made via a newly detected communication interface have a shared relationship, the setting unit 203 performs setting so that settings are the same for the communication interfaces except for the settings relating to the passwords.

Next, a description is given of changes in settings set for each communication interface in a case where the first network 110 is an intranet, the second network 111 is the Internet, and the first network 110 and the second network 111 have an independent relationship, with reference to FIG. 7. The items indicated in the table in FIG. 7 are similar to those in FIG. 5, and therefore, description thereof is omitted. First, as illustrated in the second column of the table in FIG. 7, the second network 111 to which a connection is made via the second communication interface 109 is an intranet before the first communication interface 108 is detected. Furthermore, the same settings as those described with reference to FIG. 6 are set for the second communication interface 109.

In the above-described state, the detection unit 201 detects the first communication interface 108 having been newly assigned to the information processing apparatus 100. Note that the first network 110 to which a connection is made via the first communication interface 108 is the Internet. It is assumed that the first communication interface 108 and the second communication interface 109 are not reachable from each other. In this case, the determination unit 202 determines that the first network 110 and the second network 111 are independent of each other. Accordingly, the setting unit 203 changes the settings of the second communication interface 109 so as to make the security level highest, and sets new settings for the first communication interface 108.

Specifically, for the second communication interface 109, the setting unit 203 changes the setting relating to the machine administrator password to a serial number, changes the setting relating to the confidential box access limitation to "prohibited", and changes the setting relating to the ICMP reply limitation to "prohibited". Furthermore, for the second communication interface 109, the setting unit 203 changes the setting relating to the network administrator password to the MAC address of LAN1, and changes the setting relating to Web access authentication to "ON".

The setting unit 203 sets the same settings as the changed settings set for he second communication interface 109, as common settings of the first communication interface 108. The setting unit 203 newly sets the network administrator ID "22222", the network administrator password that is the MAC address of LAN2, an IP access limitation "ON, all IP prohibited", and Web access authentication "ON", as specific settings of the first communication interface 108. In this case, access to the information processing apparatus 100 using Transmission Control Protocol/Internet Protocol (TCP/IP) via a network connecting to the first communication interface 108 is disabled. As described above, in a case where a network to which a connection is made via an existing communication interface and a network to which a connection is made via a newly detected communication interface have an independent relationship, and the network to which a connection is made via the newly detected communication interface is the Internet, the setting unit 203 changes the settings of the existing communication interface so as to make the security level highest.

Referring back to FIG. 2, the common settings memory 204 stores common settings that are settings common to communication interfaces. Specifically, the common settings memory 204 stores the above-described common settings illustrated in FIG. 3, for example.

The specific settings memory 205 stores specific settings that are settings specific to each communication interface. Specifically, the specific settings memory 205 stores the above-described specific settings illustrated in FIG. 4, for example. Note that FIG. 2 illustrates the case where the memory 104 includes the common settings memory 204 and the specific settings memory 205; however, the common settings memory 204 and the specific settings memory 205 may be outside the information processing apparatus 100.

3. Process Performed by Information Processing Apparatus

Figure 8:
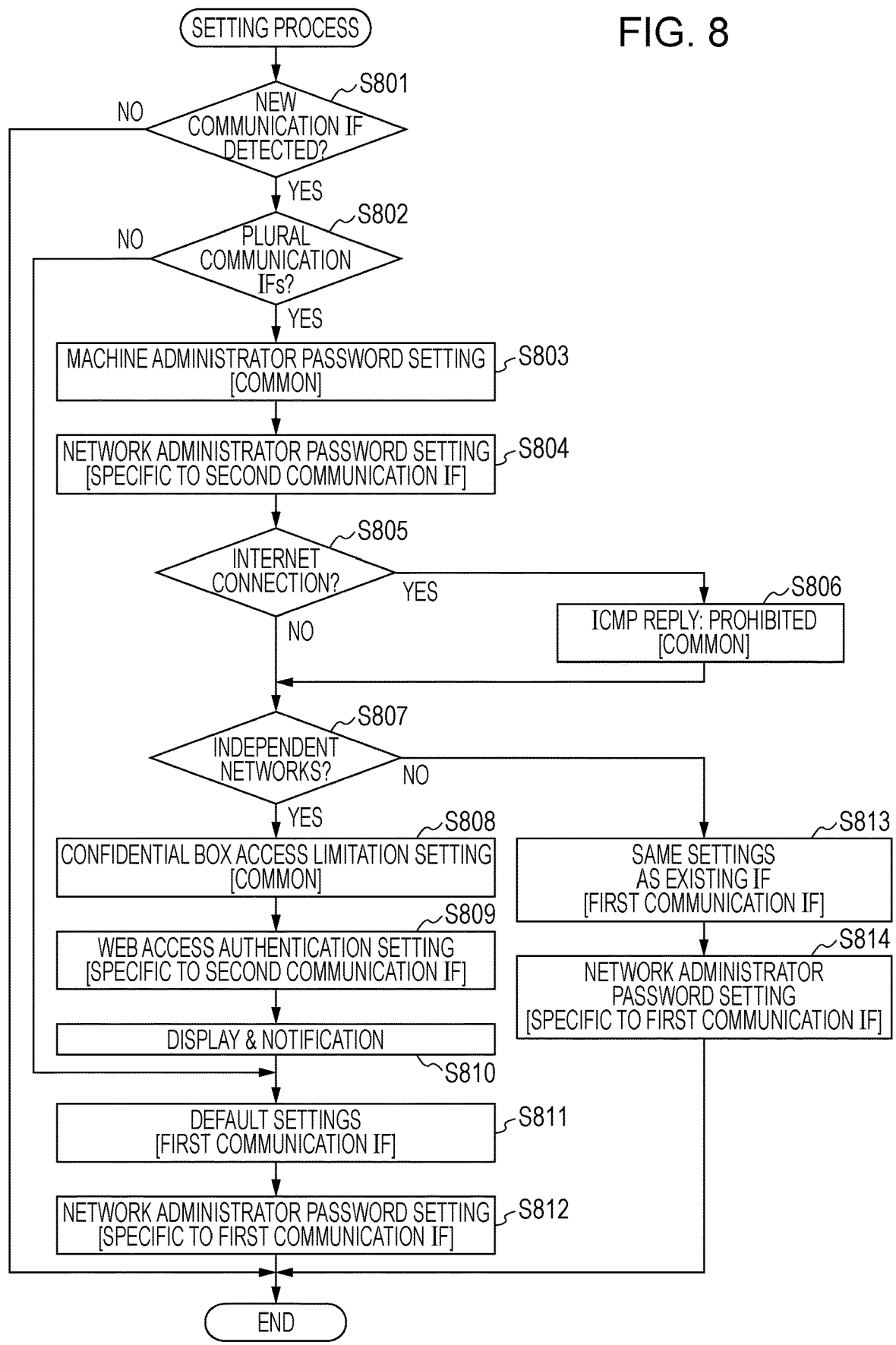
FIG. 8 illustrates an example of a flowchart for describing the process of changing settings.

Next, a process performed by the information processing apparatus 100 is described. FIG. 8 is a flowchart illustrating a process in which the information processing apparatus 100 detects a communication interface and sets settings for the communication interface. The controller 101 performs the process illustrated in FIG. 8 in accordance with the program stored on the memory 104. When the process illustrated in FIG. 8 performed, settings are newly set for each of the plural communication interfaces illustrated in FIG. 1, or settings that have been set are changed. A description is given below while assuming that only the second communication interface 109 has been assigned to the information processing apparatus 100 before the process illustrated in FIG. 8 is performed.

First, the detection unit 201 attempts to detect communication interface newly assigned to the information processing apparatus 100 and network identification information of a network to which a connection is made via the communication interface (step S801). Specifically, the detection unit 201 attempts to detect the first communication interface 108. If the detection unit 201 has detected a new communication interface (Yes in step S801), the process proceeds to step S802. If the detection unit 201 has not detected a new communication interface (No in step S801), the information processing apparatus 100 ends the setting process.

Next, if a new communication interface has been detected, the determination unit 202 determines whether there are plural communication interfaces as a result of assignment of the new communication interface (step S802). If the determination unit 202 determines that there are plural communication interfaces (Yes in step S802), the process proceeds to step S803. If the determination unit 202 determines that there are no plural communication interfaces (No in step S802), the process proceeds to step S811. In the above-described example, plural communication interfaces have been assigned to the information processing apparatus 100 as a result of new assignment of the first communication interface 108, and therefore, the process proceeds to step S803.

Next, the setting unit 203 changes the machine administrator password and the network administrator password that have been set for the second communication interface 109 (steps S803 and S804). Note that steps S803 and S804 are illustrated in a random order, and either step S803 or step 8804 may be performed first. After it has been determined that there are plural communication interfaces as described above, the setting unit 203 refers to the content of the common settings, and changes the machine administrator password to the machine serial number or the like if the machine administrator password remains unchanged from a default value (admin).

Next, the determination unit 202 determines whether the newly detected network the Internet (step S805). If the determination unit 202 determines that the newly detected network is the Internet (Yes in step S805), the process proceeds to step S806. If the determination unit 202 determines that the newly detected network is not the Internet (No in step S805), the process proceeds to step S807. Specifically, in a case where network identification information indicating that the first network 110 to which a connection is made via the first communication interface 108 is the Internet is detected in step S801, for example, the process proceeds to step S806.

If the determination unit 202 determines in step S805 that the newly detected network is the Internet, the setting unit 203 changes the setting relating to the ICMP!reply limitation to "ON" for the existing communication interface (step S806). In the above-described example, the setting unit 203 changes the setting relating to the ICMP reply limitation that has been set for the second communication. interface 109 to "ON". In this case, the specific setting is changed so as to enhance security because the network identification information indicating that the first network 110 is the Internet has been detected.

Next, the determination unit 202 determines whether the first network 110 and the second network 111 are shared networks or are independent networks (step S807) if the determination unit 202 determines that the first network 110 and the second network 111 are independent networks (Yes in step S807), the process proceeds to step S808. If the determination unit 202 determines that the first network 110 and the second network 111 are shared networks (No in step S807), the process proceeds to step S813. In the above-described example, the first network 110 is the Internet, and the second network 111 is an intranet, and therefore, the determination unit 202 determines that the first network 110 and the second network 111 are independent networks Next, if the determination unit 202 determines in step S807 that the first network 110 and the second network 111 are independent networks, the setting unit 203 sets the setting relating to the confidential box access limitation for the first communication interface 108 and for the second communication interface 109 (step S808). In the above-described example, as the setting relating to the confidential box access limitation for the first communication interface 108 and for the second communication interface 109, the setting unit 203 sets "prohibited".

Next, the setting unit 203 sets the setting relating to Web access authentication for the second communication interface 109 (step S809). In the above-described example, the setting unit 203 sets "ON" as the setting relating to Web access authentication for the second communication interface 109.

Next, the display 102 displays information indicating that the common and/or specific settings set for the second communication interface 109 have been changed to thereby notify the user of the change (step S810).

Next, the setting unit 203 newly sets settings other than the network administrator password, for the first communication interface 108 (step S811). Here, the setting unit 203 sets predetermined default settings for the first communication interface 108.

Next, the setting unit 203 newly sets the setting relating to the network administrator password, for the first communication interface 108 (step S812). Here, the setting unit 203 sets, for the first communication interface 108, a network administrator password different from the network administrator password set for the second communication interface 109. Note that steps S811 and S812 are illustrated in a random order, and either step S811 or step S812 may be performed first. After step S812, the information processing apparatus 100 ends the setting process.

On the other hand, if the determination unit 202 determines in step S807 that the first network 110 and the second network 111 are shared networks, the setting unit 203 sets the same settings as the common settings set for the second communication interface 109, as common settings of the first communication interface 108 (step S813).

Next, the setting unit 203 newly sets the setting relating to the network administrator password, for the first communication interface 108 (step S814). Here, the setting unit 203 sets, for the first communication interface 108, a network administrator password different from the network administrator password set for the second communication interface 109. Note that steps S813 and S814 are illustrated in a random order, and either step S813 or step S814 may be performed first. After step S814, the information processing apparatus 100 ends the setting process.

As described above, in a case where a new communication interface has been configured, the information processing apparatus 100 changes the common settings, sets specific settings for the newly detected communication interface, and changes the settings set for the communication interface that has been assigned earlier.

Note that this exemplary embodiment is not limited to the above-described example, and various modifications are possible. For example, there may be two or more communication interfaces that have been assigned earlier. In this case, in a case where networks to which a connection is made via the earlier-assigned communication interfaces and a network to which a connection is made via the newly assigned communication interface are intranets, the determination unit 202 checks reachability for a communication interface other than the newly assigned communication interface to thereby determine whether the network to which a connection is made via the newly assigned communication interface is a shared network or an independent network.

For example, the above-described setting process may be performed in a case where, in a state where plural communication interfaces have been assigned to the information processing apparatus 100, network identification information of some of the communication interfaces has been changed. A description is given of a specific case where the first communication interface 108 and the second communication interface 109 have been assigned, and both of the first network 110 and the second network 111 are intranets, for example. In this case, in a case where the first network 110 is modified so as to be capable of connecting to the Internet, the detection unit 201 may detect network identification information of the first network 110, and the information processing apparatus 100 may perform a process similar to that described above.

The present invention is not limited to the above-described exemplary embodiment and modifications, and various modifications are possible. The configuration and flowchart of the information processing apparatus 100 are examples and are not restrictive. The configuration may be replaced by a configuration substantially the same as that described in the above exemplary embodiment or modifications, a configuration that exerts substantially the same effects as those exerted by the configuration described in the above exemplary embodiment or modifications, or a configuration that achieves substantially the same object as that achieved by the configuration described in the above exemplary embodiment or modifications.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a first communication interface;
a second communication interface; and
a central processing unit programmed to:
   determine whether a first network to which the first communication interface is connected and a second network to which the second communication interface is connected form a shared network that permits communication between the first and second networks, the determination being made based on whether the first communication interface and the second communication interface communicate with each other; and
   in response to determining that the first communication interface and the second communication interface form the shared network, set at least one common security setting of the shared network of each of the first communication interface and the second communication interface to be equivalent, the at least one common setting controlling access within and communications from the information processing apparatus, and set at least one specific security setting of the shared network of each of the first communication interface and the second communication interface to be different from each other, the at least one specific security setting controlling authentication and access to each of the first communication interface and the second communication interface from an external device, which is externally connected to the information processing apparatus by at least one of the first network and the second network respectively.

2. The information processing apparatus according to claim 1, wherein the processor is programmed to determine whether the shared network is formed by transmitting a ping command from the first communication interface and checking for a response to the ping command at the second communication interface.

3. The information processing apparatus according to claim 1, wherein the first communication interface or the second communication interface is a network interface card that performs wired communication.

4. The information processing apparatus according to claim 1, further comprising a printer.

5. The information processing apparatus according to claim 1, further comprising a scanner.

\* \* \* \* \*